United States Patent
Wang (10) Patent No.: US 6,702,238 B1
(45) Date of Patent: Mar. 9, 2004

(54) ADJUSTABLE SUPPORTING DEVICE FOR A DISPLAY PANEL

(75) Inventor: Hsin-Yueh Wang, Chung-Ho (TW)

(73) Assignee: Top Victory Electronics Co., Ltd., Chung-Ho (TW)

( * ) Notice: Subject to any disclaimer, the term of this patent is extended or adjusted under 35 U.S.C. 154(b) by 0 days.

(21) Appl. No.: 10/400,540

(22) Filed: Mar. 28, 2003

(51) Int. Cl.⁷ .............................................. F16M 13/00
(52) U.S. Cl. .................................... 248/125.8; 248/404
(58) Field of Search ............................. 248/125.8, 159, 248/123.11, 404, 622, 917, 919

(56) References Cited

U.S. PATENT DOCUMENTS

| | | | | |
|---|---|---|---|---|
| 4,690,362 A | * | 9/1987 | Helgeland | 248/404 |
| 6,233,139 B1 | * | 5/2001 | Hamon | 361/681 |
| 6,367,756 B1 | * | 4/2002 | Wang | 248/278.1 |
| 6,392,873 B1 | * | 5/2002 | Honda | 361/681 |
| 6,517,040 B1 | * | 2/2003 | Wen | 248/278.1 |
| D478,088 S | * | 8/2003 | Hamouz | D14/451 |
| 2003/0075649 A1 | * | 4/2003 | Jeong et al. | 248/157 |

FOREIGN PATENT DOCUMENTS

TW        270517       2/1996

* cited by examiner

Primary Examiner—Leslie A. Braun
Assistant Examiner—Kofi Schulterbrandt
(74) Attorney, Agent, or Firm—Foley & Lardner (57) ABSTRACT

An adjustable supporting device for a display panel includes a stationary supporting member having a tube portion disposed uprightly on a base portion, and a movable rod member movably extended into and in friction engagement with the tube portion. The rod member includes a rod body coupled to a display panel and formed with an inner recess, and a mounting cap mounted on the rod body and cooperating with the inner recess so as to confine a receiving space. A biasing member has a straight coupling portion coupled to the tube portion of the stationary supporting member, and a spiral portion connected to the coupling portion and disposed in the receiving space. The mounting cap is formed with a positioning unit for positioning the spiral portion of the biasing member in the receiving space.

5 Claims, 7 Drawing Sheets

FIG. 9

ADJUSTABLE SUPPORTING DEVICE FOR A DISPLAY PANEL

BACKGROUND OF THE INVENTION

1. Field of the Invention

The invention relates to a supporting device, more particularly to an adjustable supporting device for a display panel.

2. Description of the Related Art

Figure 1:
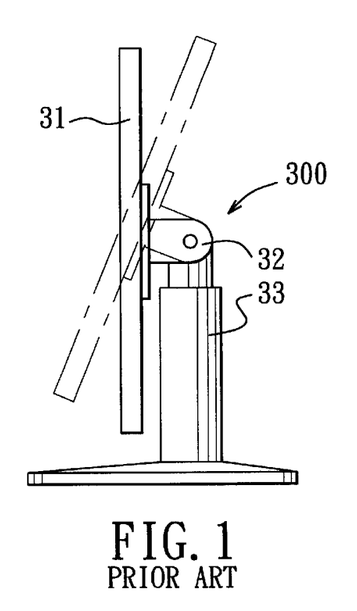
FIG. 1 is a schematic view of a conventional display device.
Figure 2:
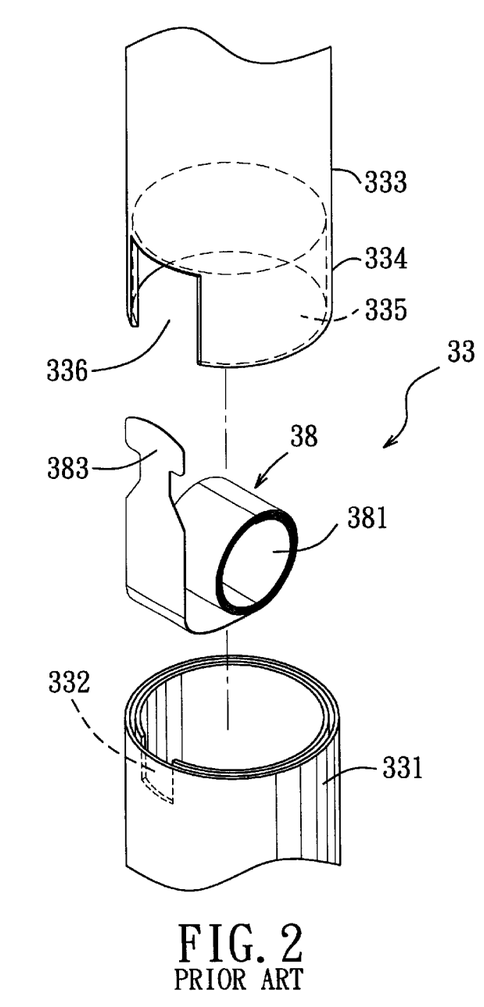
FIG. 2 is a fragmentary exploded perspective view of a supporting unit of the conventional display device.

FIG. 1 illustrates a conventional display device 300 that includes a display panel 31, a supporting member 33 for supporting the display panel 31, and a coupling member 32 connected to the display panel 31 and coupled pivotally to the supporting member 33. Referring to FIG. 2, the supporting member 33 includes a stationary outer tube 331, a movable rod body 333, and a spiral spring 38. The rod body 333 is movably extended into the outer tube 331 and is in friction engagement with the outer tube 331. The rod body 333 has an upper portion (not shown) coupled to the coupling member 32, and a lower portion 334 formed with an inner recess 335 and a radial passage groove 336 that is communicated with the inner recess 335. The spiral spring 38 has a coupling portion 383 that engages an engaging groove 332 formed in an upper end of the outer tube 331, and a spiral portion 381 disposed in the inner recess 336. As such, the spiral spring 38 provides a biasing force such that an equilibrium state among the biasing force, a friction force between the outer tube 331 and the rod body 333, and the combined weight of the display panel 31 and the rod body 333 can be achieved so as to maintain the rod body 333 at a desired extended position relative to the outer tube 331.

However, since the spiral spring 38 is not positioned in the inner recess 336, the spiral spring 38 easily wobbles during adjustment of the height of the display panel 31 such that smooth sliding movement of the rod body 333 cannot be ensured, thereby resulting in inconvenience during use.

SUMMARY OF THE INVENTION

Therefore, the object of the present invention is to provide an adjustable supporting device which can overcome the aforesaid drawback associated with the prior art.

According to the present invention, there is provided an adjustable supporting device for a display panel. The adjustable supporting device comprises:

a stationary supporting member having a lower base portion, and an upper tube portion disposed uprightly on the lower base portion and extending in a first direction, the upper tube portion having an upper end, a lower end connected to the lower base portion, and an inner surface;

a movable rod member movably extended into the upper tube portion and in friction engagement with the upper tube portion, the rod member including a rod body that has an upper portion adapted to be coupled to the display panel, and a lower portion formed with an inner recess and a radial passage groove communicated with the inner recess, and a mounting cap mounted on the lower portion and cooperating with the inner recess so as to confine a receiving space that is accessible through the passage groove; and a biasing member having a straight coupling portion passing through the passage groove in the rod body and coupled to the inner surface of the upper tube portion of the stationary supporting member, and a spiral portion connected to the coupling portion and disposed in the receiving space, the biasing member providing a biasing force such that an equilibrium state among the biasing force, a friction force between the stationary supporting member and the movable rod member, and the combined weight of the display panel and the movable rod member is achieved so as to maintain the movable rod member at a desired extended position between upper and lower limit positions relative to the tube portion of the stationary supporting member;

wherein the mounting cap is formed with a positioning unit for positioning the spiral portion of the biasing member in the receiving space so as to prevent the spiral portion of the biasing member from wobbling in a second direction transverse to the first direction.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
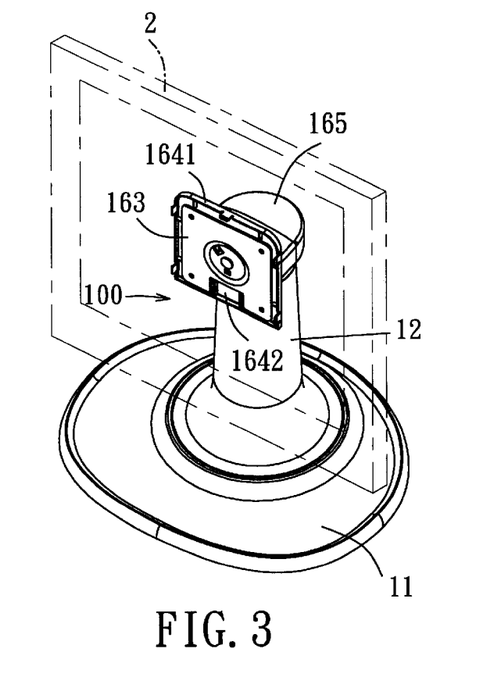
FIG. 3 is a perspective view showing the preferred embodiment of an adjustable supporting device for a display panel according to the present invention.
Figure 4:
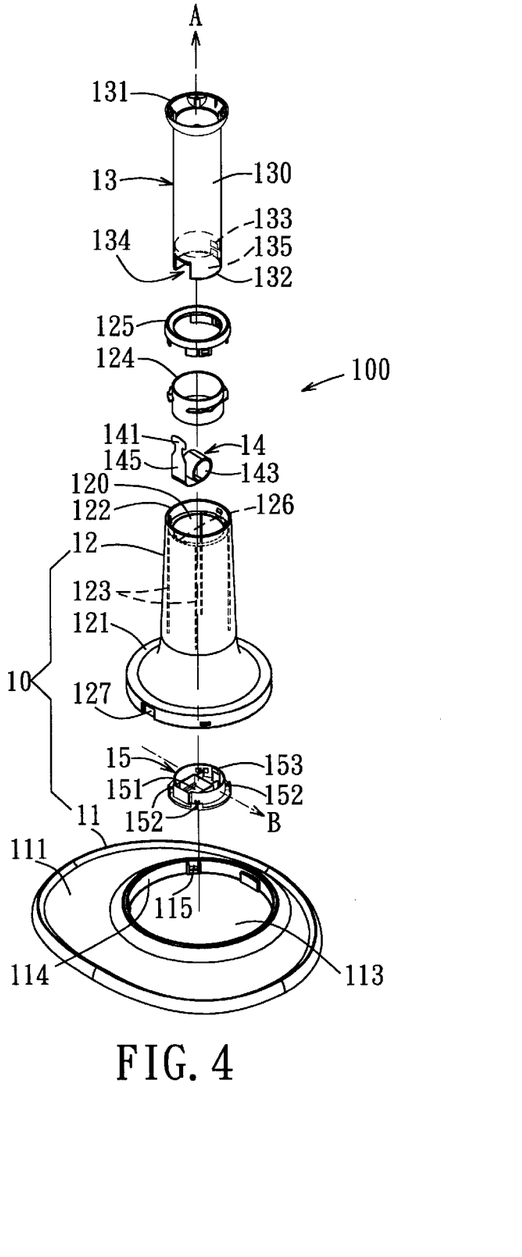
FIG. 4 is an exploded perspective view showing a stationary supporting member, a movable rod member and a biasing member of the preferred embodiment.
Figure 6:
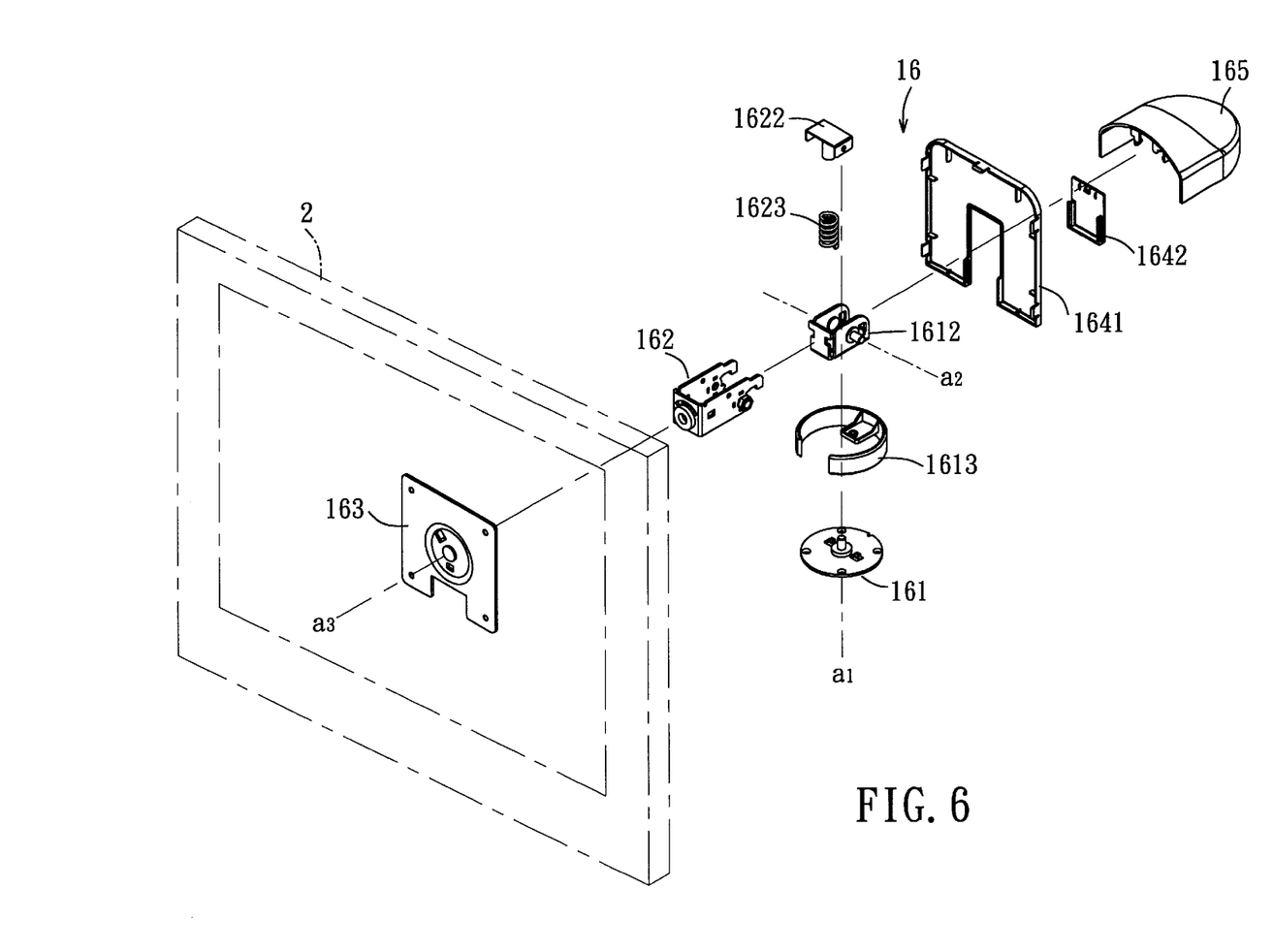
FIG. 6 is an exploded perspective view showing a universal joint member of the preferred embodiment.

Referring to FIGS. 3, 4 and 6, the preferred embodiment of an adjustable supporting device 100 for a display panel 2 according to the present invention is shown to include a stationary supporting member 10, a movable rod member 13, a biasing member 14, and a universal joint member 16.

The supporting member 10 has a lower base portion 11, and an upper tube portion 12 disposed uprightly on the lower base portion 11 and extending in a first direction (A). The upper tube portion 12 has an upper end 122, a lower end 121 connected to the lower base portion 11, and an inner surface 120. In this embodiment, the lower base portion 11 is substantially elliptical in shape, and is formed with an engaging groove 113 that has a surrounding wall 114. The surrounding wall 114 is formed with an engaging lug 115. The lower end 121 of the upper tube portion 12 is engaged within the engaging groove 113 in the lower base portion 11 by means of engagement between the engaging lug 115 and an engaging slot 127 formed in the lower end 121 of the upper tube portion 12. The inner surface 120 of the upper tube portion 12 is formed with a plurality of radially arranged guiding ribs 123 that extend along the first direction (A).

Figure 5:
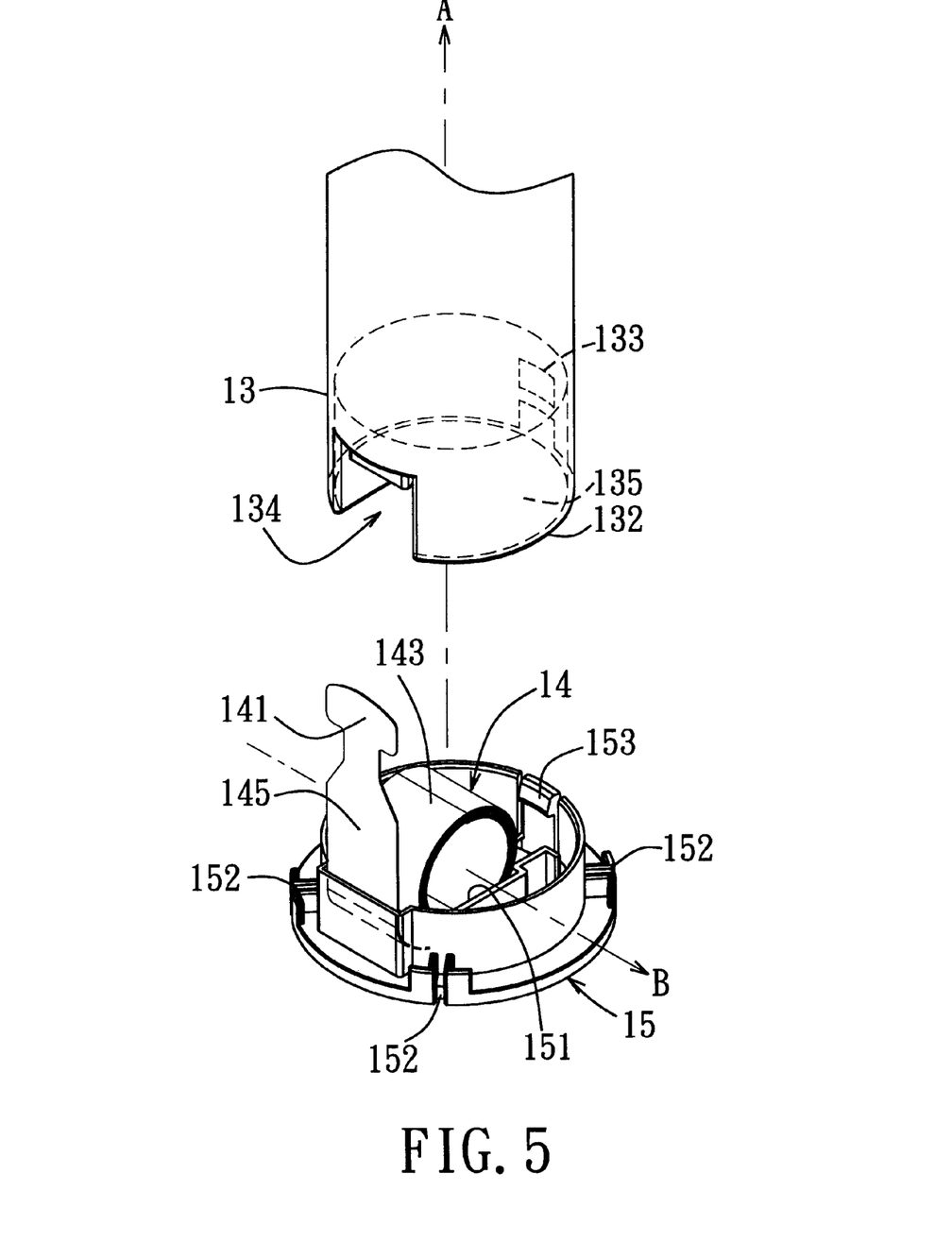
FIG. 5 is a fragmentary perspective view illustrating how the biasing member is installed on the rod member.

The rod member 13 is movably extended into the upper tube portion 12 and is in friction engagement with the upper tube portion 12. The rod member 13 includes a rod body 130 and a mounting cap 15. The rod body 130 has an upper portion 131, and a lower portion 132 formed with an inner recess 135 and a radial passage groove 134 that is communicated with the inner recess 135. The mounting cap 15 is mounted on the lower portion 132 and cooperates with the inner recess 135 so as to confine a receiving space that is accessible through the passage groove 134. In this embodiment, the mounting cap 15 is formed with a plurality of radially arranged guiding grooves 152 extending along the first direction (A) and in sliding engagement with the guiding grooves 152, respectively, for guiding movement of the movable rod member 13 relative to the stationary supporting member 10 in the first direction (A), and an engaging lug 153 that engages a radial engaging hole 133, which is formed in the rod body 130 and which is communicated with the inner recess 135, for securing the mounting cap 15 on the lower portion 132 of the rod body 130, as shown in FIG. 5.

In this embodiment, the biasing member 14 is a spiral spring that has a straight coupling portion 145 and a spiral portion 143. The straight coupling portion 145 passes through the passage groove 134 in the rod body 130, and has a T-shaped end 141 that is coupled to a coupling groove 126 formed in the inner surface 120 of the upper tube portion 12 adjacent to the upper end 122 by means of engagement with fastening rings 124, 125 sleeved on the rod body 130 and disposed between the rod body 130 and the inner surface 120 of the upper tube portion 12. The spiral portion 143 is connected to the coupling portion 145 and is disposed in the receiving space, as shown in FIG. 5. The mounting cap 15 is formed with a positioning unit for positioning the spiral portion 143 of the biasing member 14 in the receiving space so as to prevent the spiral portion 143 of the biasing member 14 from wobbling in the second direction (B) transverse to the first direction (A), as best shown in FIG. 5. In this embodiment, the positioning unit is formed as a positioning groove 151.

The universal joint member 16 is coupled to the upper portion 131 of the rod body 130 of the rod member 13, and is adapted to be coupled to the display panel 2. As shown in FIG. 6, the universal joint member 16 includes a first coupling piece 161 coupled to the upper portion 131 of the rod body 130, a second coupling piece 1612 coupled pivotally to the first coupling piece 161 such that the second coupling piece 1612 is rotatable relative to the first coupling piece 161 about a first axis (a1) parallel to the first direction (A), a third coupling piece 162 coupled pivotally to the second coupling piece 1612 such that the third coupling piece 162 is rotatable relative to the second coupling piece 1612 about a second axis (a2) transverse to the first axis (a1), a fourth coupling piece 163 coupled pivotally to the third coupling piece 162 and adapted to be coupled to the display panel 2 such that the fourth coupling piece 163 is rotatable relative to the third coupling piece 162 about a third axis (a3) transverse to the first and second axes (a1, a2), a biasing spring 1623 acting on the coupling pieces 1612, 162, and a plurality of cover pieces 1613, 1622, 1641, 1642, 165 for decorative and protection purposes.

Figure 7:
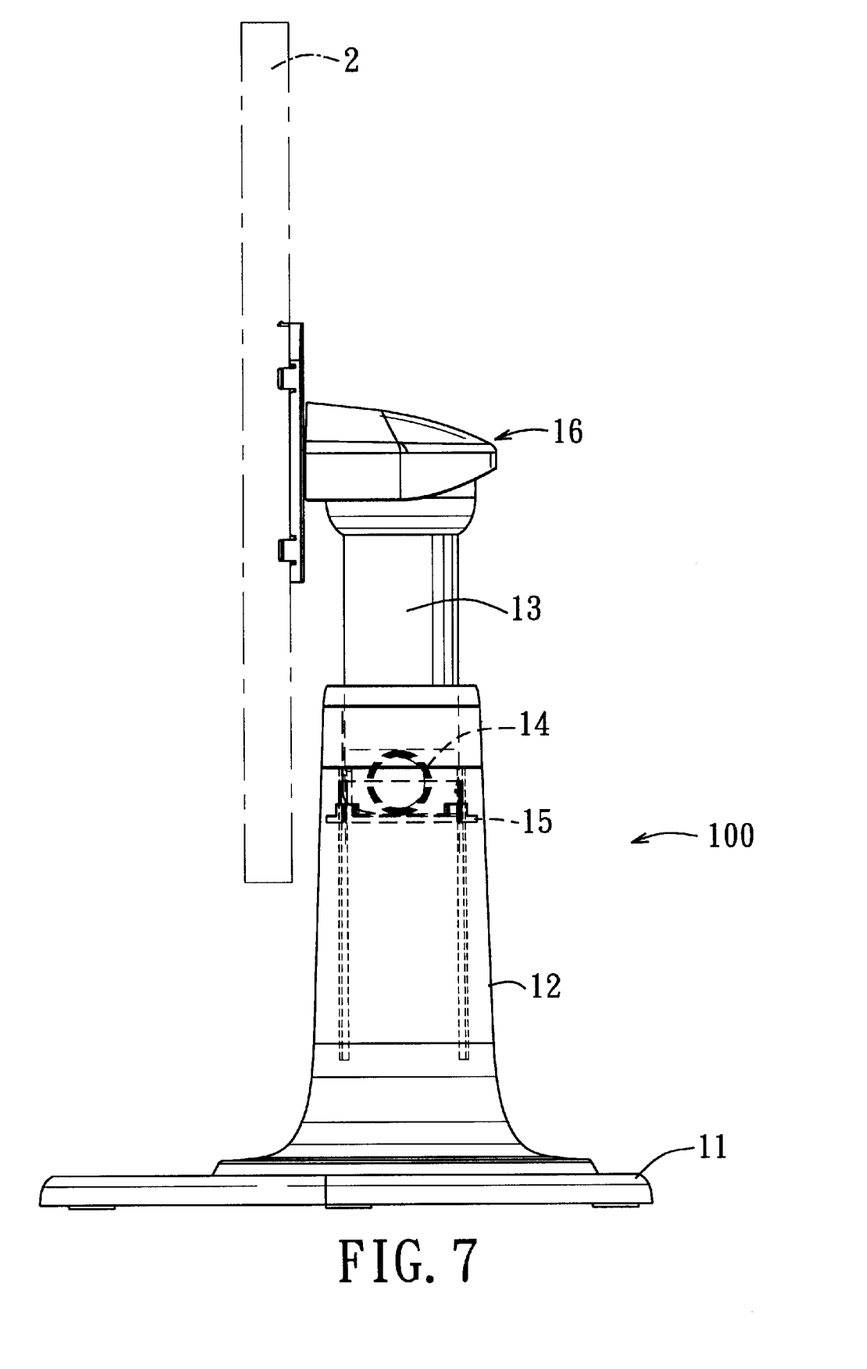
FIG. 7 is a schematic side view showing the preferred embodiment when the rod member is disposed at an upper limit position.
Figure 8:
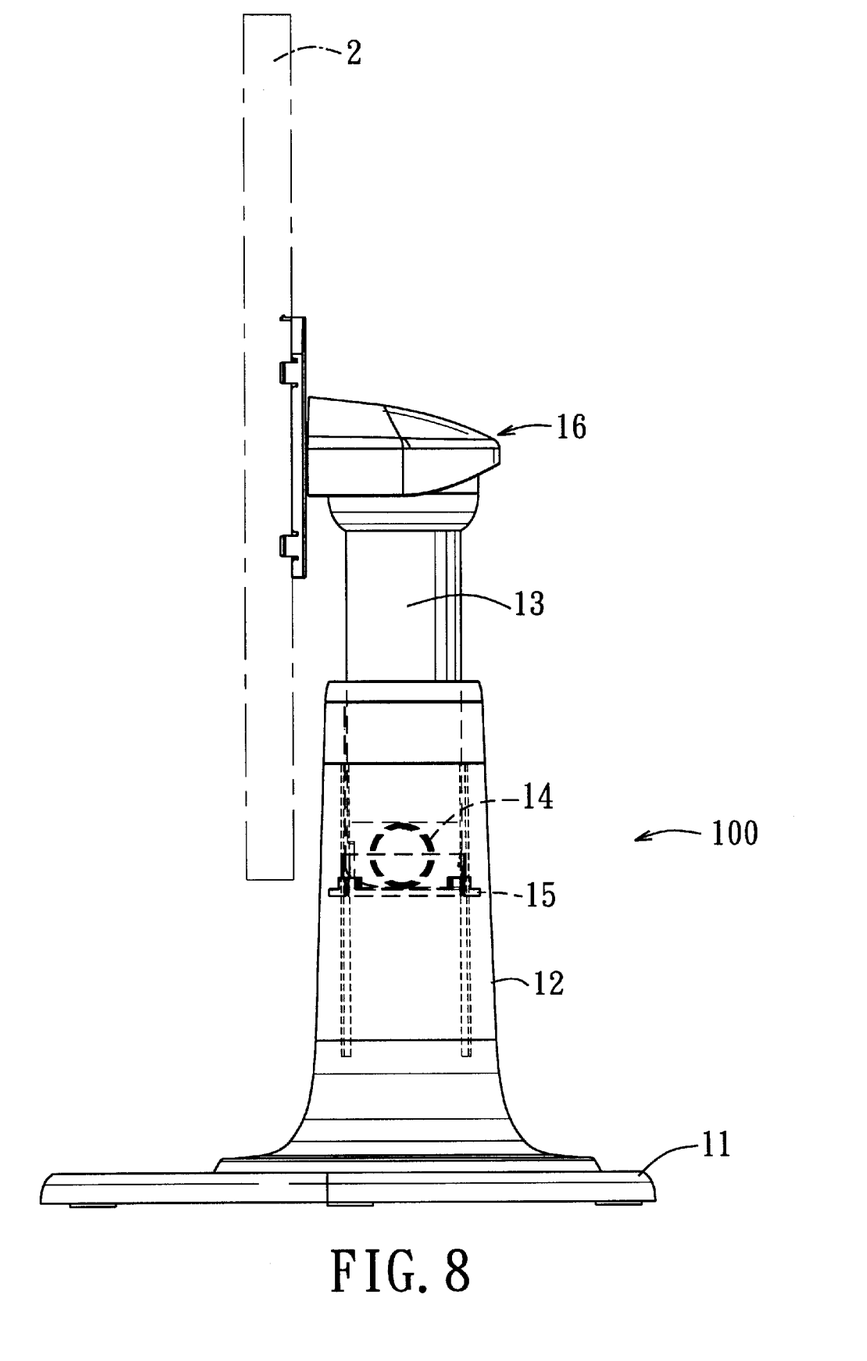
FIG. 8 is a schematic side view showing the preferred embodiment when the rod member is disposed at a desired extended position.
Figure 9:
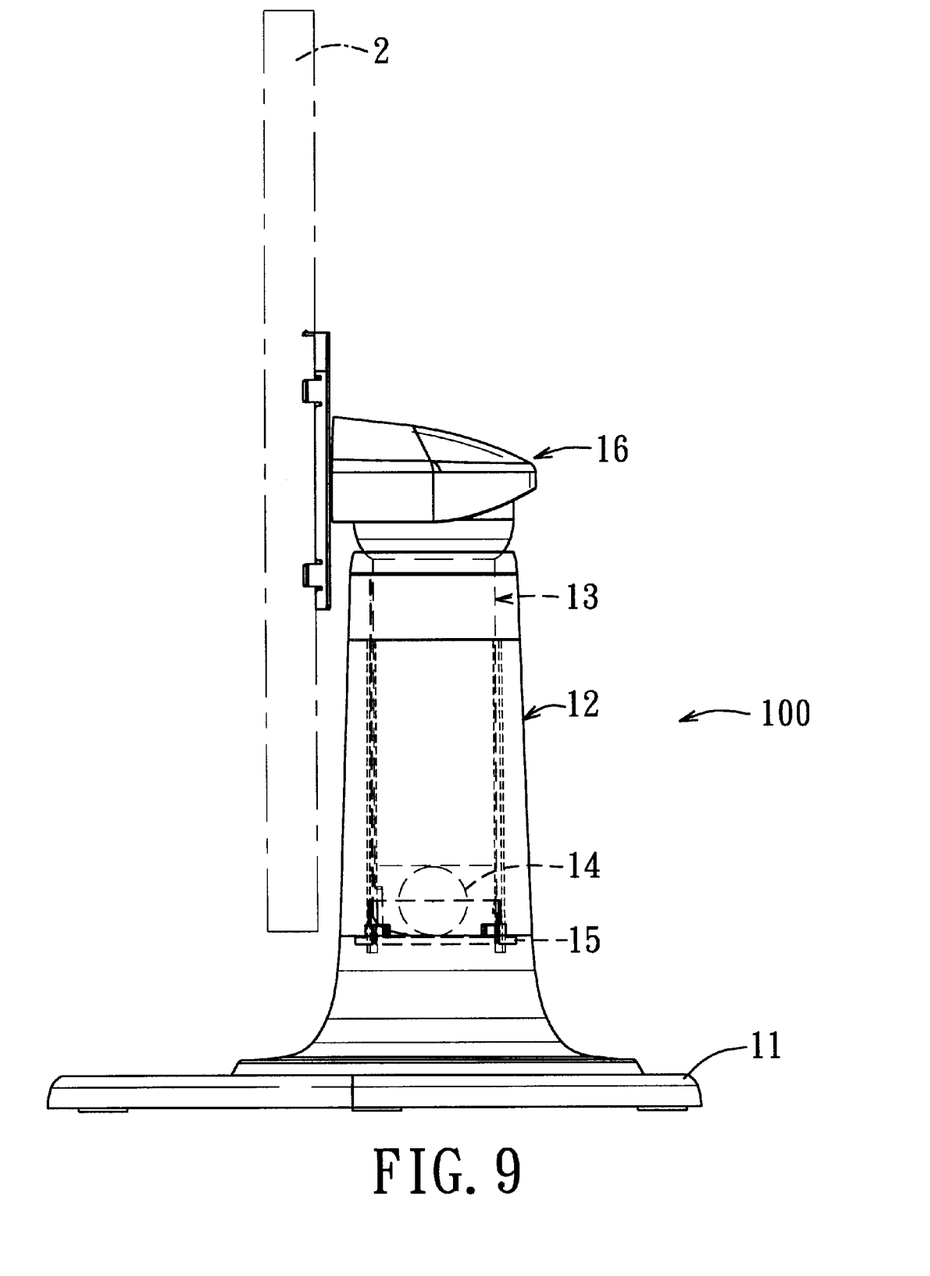
FIG. 9 is a schematic side view showing the preferred embodiment when the rod member is disposed at a lower limit position.

As in the prior art described herein above, the biasing member 14 provides a biasing force such that an equilibrium state among the biasing force, a friction force between the stationary supporting member 10 and the movable rod member 13, and the combined weight of the display panel 2, the universal joint member 16 and the movable rod member 13 is achieved so as to maintain the movable rod member 13 at a desired extended position between upper and lower limit positions relative to the tube portion 12 of the stationary supporting member 10 (see FIGS. 7 to 9).

Due to the presence of the mounting cap 15, the spiral portion 143 of the biasing member 14 can be positioned in the positioning groove 151, which serves as a positioning unit, so as to prevent the spiral portion 143 of the biasing member 14 from wobbling such that smooth sliding movement of the movable rod member 13 relative to the supporting member 10 can be ensured during adjustment of the height of the display panel 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An adjustable supporting device for a display panel, comprising:

a stationary supporting member having a lower base portion, and an upper tube portion disposed uprightly on said lower base portion and extending in a first direction, said upper tube portion having an upper end, a lower end connected to said lower base portion, and an inner surface;

a movable rod member movably extended into said upper tube portion and in friction engagement with said upper tube portion, said rod member including a rod body that has an upper portion adapted to be coupled to the display panel, and a lower portion formed with an inner recess and a radial passage groove communicated with said inner recess, and a mounting cap mounted on said lower portion and cooperating with said inner recess so as to confine a receiving space that is accessible through said passage groove; and a biasing member having a straight coupling portion passing through said passage groove in said rod body and coupled to said inner surface of said upper tube portion of said stationary supporting member, and a spiral portion connected to said coupling portion and disposed in said receiving space, said biasing member providing a biasing force such that an equilibrium state among the biasing force, a friction force between said stationary supporting member and said movable rod member, and the combined weight of the display panel and said movable rod member is achieved so as to maintain said movable rod member at a desired extended position between upper and lower limit positions relative to said tube portion of said stationary supporting member;

wherein said mounting cap is formed with a positioning unit for positioning said spiral portion of said biasing member in said receiving space so as to prevent said spiral portion of said biasing member from wobbling in a second direction transverse to the first direction.

2. The adjustable supporting device as claimed in claim 1, wherein said mounting cap is formed with a guiding groove extending along the first direction, said inner surface of said upper tube portion being formed with a guiding rib extending along the first direction and in sliding engagement with said guiding groove for guiding movement of said movable rod member relative to said stationary supporting member in the first direction.

3. The adjustable supporting device as claimed in claim 1, wherein said biasing member is a spiral spring.

4. The adjustable supporting device as claimed in claim 1, wherein said rod body is formed with a radial engaging hole communicated with said inner recess, said mounting cap of said movable rod member being formed with an engaging lug that engages said engaging hole for securing said mounting cap on said rod body.

5. The adjustable supporting device as claimed in claim 1, further comprising a universal joint member coupled to said upper portion of said rod body of said rod member and adapted to be coupled to the display panel.

* * * * *

UNITED STATES PATENT AND TRADEMARK OFFICE
CERTIFICATE OF CORRECTION

PATENT NO.     : 6,702,238 B1
DATED          : March 19, 2004
INVENTOR(S)    : Hsin-Yueh Wang It is certified that error appears in the above-identified patent and that said Letters Patent is hereby corrected as shown below:

<u>Title page,</u>
Item [73], Assignee, should read as follows:
-- [73]   Assignee:        Top Victory Electronics (Taiwan) Co., Ltd., Chung-Ho (TW) --

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.     : 6,702,238 B1
DATED          : March 9, 2004
INVENTOR(S)    : Hsin-Yueh Wang It is certified that error appears in the above-identified patent and that said Letters Patent is hereby corrected as shown below:

<u>Title page,</u>
Item [73], Assignee, should read as follows:
-- [73]   Assignee:     Top Victory Electronics (Taiwan) Co., Ltd., Chung-Ho (TW) --

This certificate supersedes Certificate of Correction issued June 22, 2004.

Signed and Sealed this

Twenty-eighth Day of September, 2004

JON W. DUDAS
*Director of the United States Patent and Trademark Office*